United States Patent
Chitre et al.

[11] Patent Number: 5,600,653
[45] Date of Patent: Feb. 4, 1997

[54] TECHNIQUE FOR IMPROVING ASYNCHRONOUS TRANSFER MODE OPERATION OVER A COMMUNICATIONS LINK WITH BURSTY BIT ERRORS

[75] Inventors: Dattakumar M. Chitre, Silver Spring; Dilip S. Gokhale, Gaithersburg; Thomas Henderson, Bethesda; John A. Lunsford, Gaithersburg; Neville Mathews, Derwood, all of Md.

[73] Assignee: Comsat Corporation, Bethesda, Md.

[21] Appl. No.: 315,485

[22] Filed: Sep. 30, 1994

[51] Int. Cl.⁶ .................................... H04L 1/00
[52] U.S. Cl. .................. 370/474; 370/513; 370/395; 371/39.1
[58] Field of Search .................. 371/2.1, 5.1, 38.1, 371/39.1, 42, 45, 46; 370/60.1, 94.1, 94.2, 106; 375/366

[56] References Cited

U.S. PATENT DOCUMENTS

| | | | |
|---|---|---|---|
| 4,312,070 | 1/1982 | Coombes et al. | 371/39.1 |
| 4,425,644 | 1/1984 | Scholz | 371/39.1 |
| 4,978,955 | 12/1990 | Howell | 371/39.1 |
| 5,022,029 | 6/1991 | Guichon | 371/2.1 |
| 5,159,452 | 10/1992 | Kinoshita et al. | 371/39.1 |
| 5,187,811 | 2/1993 | Baker et al. | 371/5.1 |
| 5,230,002 | 7/1993 | Yamashita et al. | 371/37.1 |
| 5,274,768 | 12/1993 | Traw et al. | 395/275 |
| 5,282,215 | 1/1994 | Hyodo et al. | 371/42 |
| 5,287,358 | 2/1994 | Nakayama | 370/94.1 |
| 5,309,450 | 5/1994 | Kim | 371/39.1 |
| 5,379,297 | 1/1995 | Glover et al. | 370/94.2 |
| 5,434,846 | 7/1995 | Tremel et al. | 370/94.1 |
| 5,434,855 | 7/1995 | Perlman et al. | 370/94.1 |

*Primary Examiner*—Benedict V. Safourek
*Attorney, Agent, or Firm*—Sughrue, Mion, Zinn, Macpeak & Seas

[57] ABSTRACT

In an asynchronous transfer mode (ATM) system, interleaved cells are formed at the transmit end by combining into each interleaved cell certain bits from each of plural different original ATM cells, the interleaved cells are transmitted over the communications link, and then deinterleaved at the receive end. Any bursty errors occurring on the communications link will, after deinterleaving, be spread out over multiple original ATM cells, maximizing the error correction for ATM cells and error detection for AAL capability and minimizing loss of data. The C1 byte in the Physical Layer Convergence Protocol (PLCP), which indicates the location of end of the PLCP frame, is protected against the burst errors by replication of C1 byte through inserting them in the growth bytes Z1 through Z4.

21 Claims, 8 Drawing Sheets

TECHNIQUE FOR IMPROVING ASYNCHRONOUS TRANSFER MODE OPERATION OVER A COMMUNICATIONS LINK WITH BURSTY BIT ERRORS

BACKGROUND OF THE INVENTION

This invention relates to Asynchronous Transfer Mode (ATM) communications, and more particularly to techniques for reducing by many orders of magnitude, ATM cell losses due to burst errors.

The invention is particularly applicable to ATM operation in any telecommunications environment where bit errors on the communications link tend to be bursty, e.g., a coded satellite link whose decoded output is characterized by burst errors.

ATM is a new method for carrying voice, dam, image and video services via telecommunications networks. ATM transports all traffic in fixed-size data units called cells. The ATM cell consists of 5 bytes of overhead (referred to as the cell header) and 48 bytes of data (referred to as the information field). The cell header contains the routing information and is provided with extra protection (so as not to lose 48 bytes of information) consisting of a single bit error correcting ATM Header Error Correction (HEC) code. The ATM cells with two or more bits of error in the header are discarded. This method works very well, resulting in a very low cell loss over communications links with random distribution of single bit errors. Unfortunately, burst errors cannot be corrected by the ATM HEC, resulting in ATM cell losses over bursty error links which can be orders of magnitude higher than over links with random errors. The present invention provides a technique to avoid the loss of cells due to burst error.

In principle, ATM cells may be transported using any digital transmission format. However, the recently approved synchronous digital hierarchy (SDH) and plesiochronous digital hierarchy (PDH) signal formats are of interest from the viewpoint of national and international standardization. An important feature in SDH transmission is the inclusion of pointer bytes, which are used to indicate the location of the first byte in the payload of the SDH frame and also to avoid slips and their associated data loss due to slight phase or frequency variations between the SDH payload and the frame. ATM cell transmission via SDH further incorporates a cell delineation mechanism for the acquisition and synchronization of ATM cells on the receive side of the network.

Transmission considerations and performance criteria for both ATM and its carriage in the SDH and PDH frames are currently based on the assumption that bit errors encountered over the communications path are randomly distributed. The bursty nature of errors results in degradation of performance of both the SDH/PDH transport signals and the ATM cells contained within them through loss of framing. The present invention provides a technique to avoid the loss of framing due to burst errors.

The 48 byte information data field in the ATM cell corresponds to the ATM adaptation layer (AAL). The AAL includes an error detection mechanism which is not robust against burst errors, resulting in undetected errors. Again, the present invention handles burst errors in such a way as not to produce any undetected errors.

SUMMARY OF THE INVENTION

It is an object of the present invention to provide ATM services via communications links with burst errors (e.g. forward error correction coded satellite links) at an extremely high quality with respect to ATM cell losses, AAL undetected errors and the loss of frames.

The present invention provides an ATM Link Enhancer (ALE) between the ATM switch or multiplexer and the communications link. The ATM switch/multiplexer transmits ATM cells to the ALE via a standard physical interface. The key functions of the ALE are to terminate the physical layer protocol which is carrying within it the ATM cells (and the AAL protocol data units), extract the ATM cells, and reformat (i) the physical layer, (ii) ATM layer and (iii) AAL layer data bits. The new bit stream is then passed to the communications link equipment (e.g., modem) via a standard physical interface. The reverse process takes place at the destination end of the communications link. The ALE receives the bit streams from the communications link equipment. The ALE processes the bit stream to bring back the original format of the physical layer, ATM layer and AAL layer data bits. The ALE also detects and corrects the single bit errors in the ATM cell header before the ATM cells are sent to the ATM switch via a standard physical interface.

The present invention is concerned with the identification of the severe degradation of the performance of ATM cells, the underlying physical layer and the AAL layer due to burst errors encountered over communications links, and the techniques implemented in the ALE to remove this degradation. Finally, it is noteworthy that the introduction of the ALE in the communications path is totally transparent to the end users and the network.

The invention can be applied to improve the performance of ATM operation in any telecommunications environment which experiences burst errors, e.g., forward error correction coded satellite links, encrypted terrestrial links, and terrestrial or satellite links with switch paths. Furthermore, the invention is applicable to ATM operation via the geosynchronous satellite system as well as other lower earth orbiting satellite systems.

BRIEF DESCRIPTION OF THE DRAWINGS

The invention will be more clearly understood from the following description in conjunction with the accompanying drawings, wherein.

DESCRIPTION OF THE PREFERRED EMBODIMENTS

The present invention, pertaining to the prevention of ATM cell loss due to cell header corruption, is based on the following observations. First, the ATM cell header is protected against a single bit error by the Header Error Correction (HEC) code, which is the fifth byte of the five byte header. Second, an ATM cell header with two or more bit errors results in the loss of the entire ATM cell and its 48 byte payload, but to prevent such a loss a selective interleaving and deinterleaving technique is used to spread the typical burst of errors encountered over the communications path in such a way that: (a) ATM cell headers are left with a random distribution of error after the deinterleaving operation is completed; (b) the resulting ATM cells with possible single bit errors in the header are corrected by the HEC; and (c) no payload bit is impacted (corrupted).

It is very critical not to corrupt any payload bits (as would happen in a typical interleaving scheme which is not selective with respect to the header), since that bit error cannot be corrected in the ATM operation and, if the ATM payload corresponds to data service, it will lead to the loss of a higher layer data packet consisting of typically many hundred bytes.

The implementation of the invention is referred to as an ATM Link Enhancer (ALE). The placement of the ALE between an ATM switch/multiplexer and the communications link has no impact on the user or the network, except for a slight increase in delay dependent upon the interleaver length (in ATM cells) at lower rates and long burst errors. For ATM operation at 155.52 Mbps and higher rates, there is no increase in delay.

Figure 1:
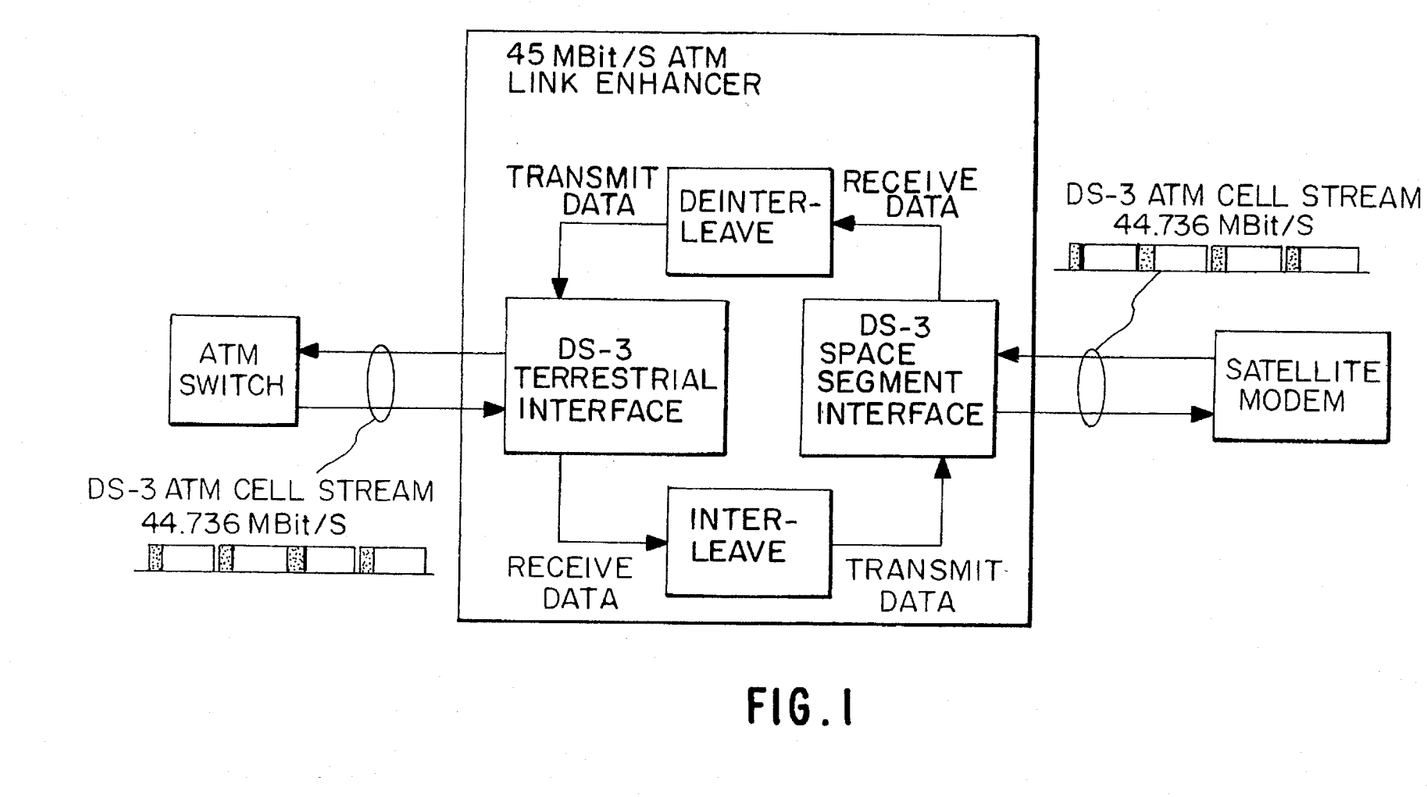
FIG. 1 is a diagram showing one example of an arrangement according to the present invention, with an ALE inserted into a satellite transmission path.

One example of the application of the invention is shown in FIG. 1, where the communications link is a coded satellite link and the ATM switch has a DS-3 (44.736) Mbps) ATM interface. There are 12 ATM cells every 125 microseconds in the DS-3 payload. As one embodiment of the present technique, one can use ten 125 microsecond frames, which give 120 ATM cells. The new interleaved cell header will comprise bits from forty different ATM cell headers. If you rank the newly formatted cells in the interleaved frame from 1 to 120, the first interleaved cell will comprise first bits from the original ATM cells numbered 1, 4, 7, 10, . . , 118; the second interleaved cell will comprise first bits from the original cells numbered 2, 5, 8, 11,..., 119; the third interleaved cell will comprise the first bits from the original ATM cells numbered 3, 6, 9, 12, . . . , 120; the fourth interleaved cell will comprise the second bits from the original ATM cells 1, 4, 7, 10, . . . , 118; etc., until the 120th interleaved cell which will comprise the 40th bits of the original ATM cells 3, 6, 9, 12, . . . 120. In this way, 120 new cell headers are generated, with the first forty bits (i.e., the five header bytes) of each original ATM cell spread out over forty different interleaved cells.

Figure 2:
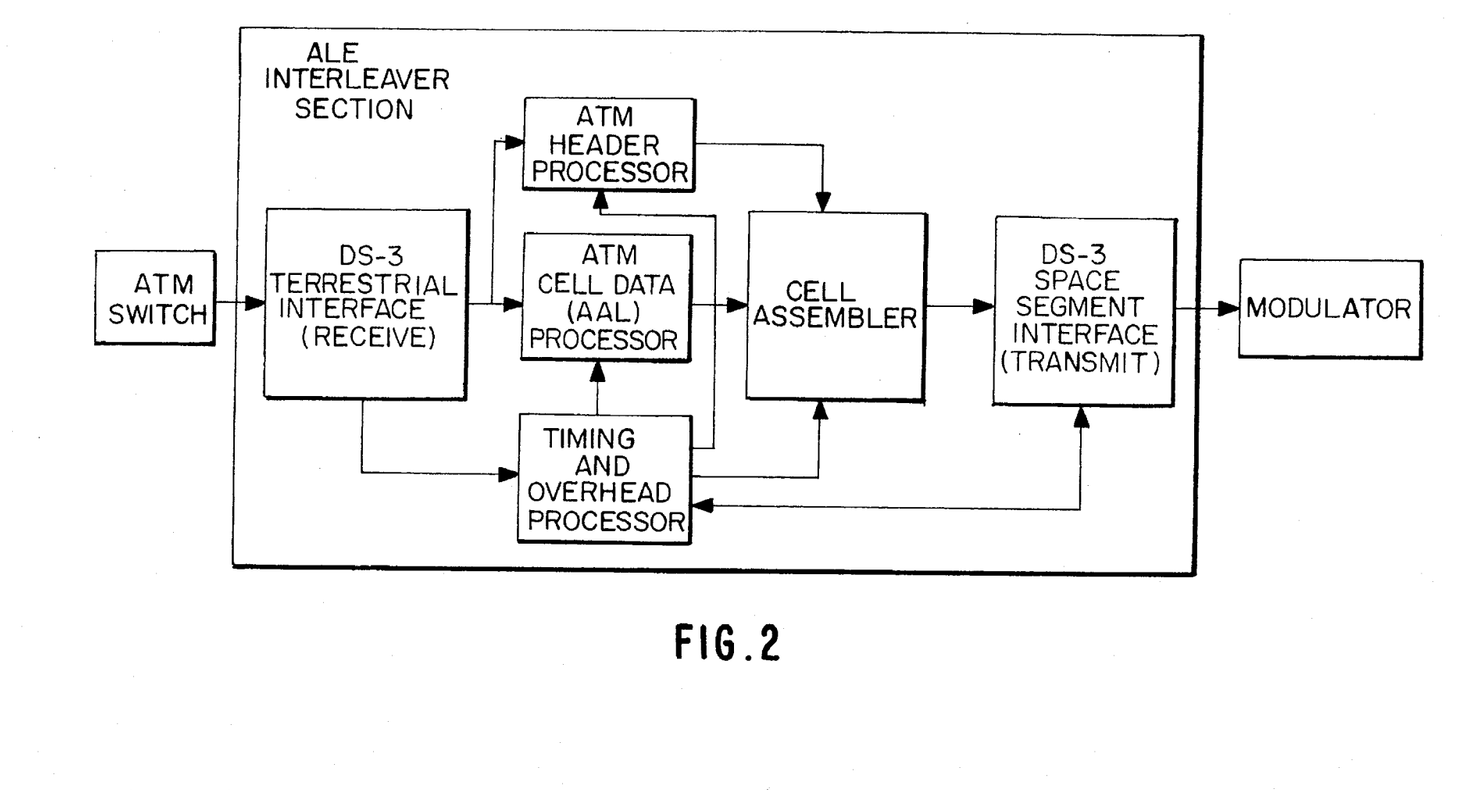
FIG. 2 illustrates a more detailed block diagram of the interleaver in FIG. 1.
Figure 3:
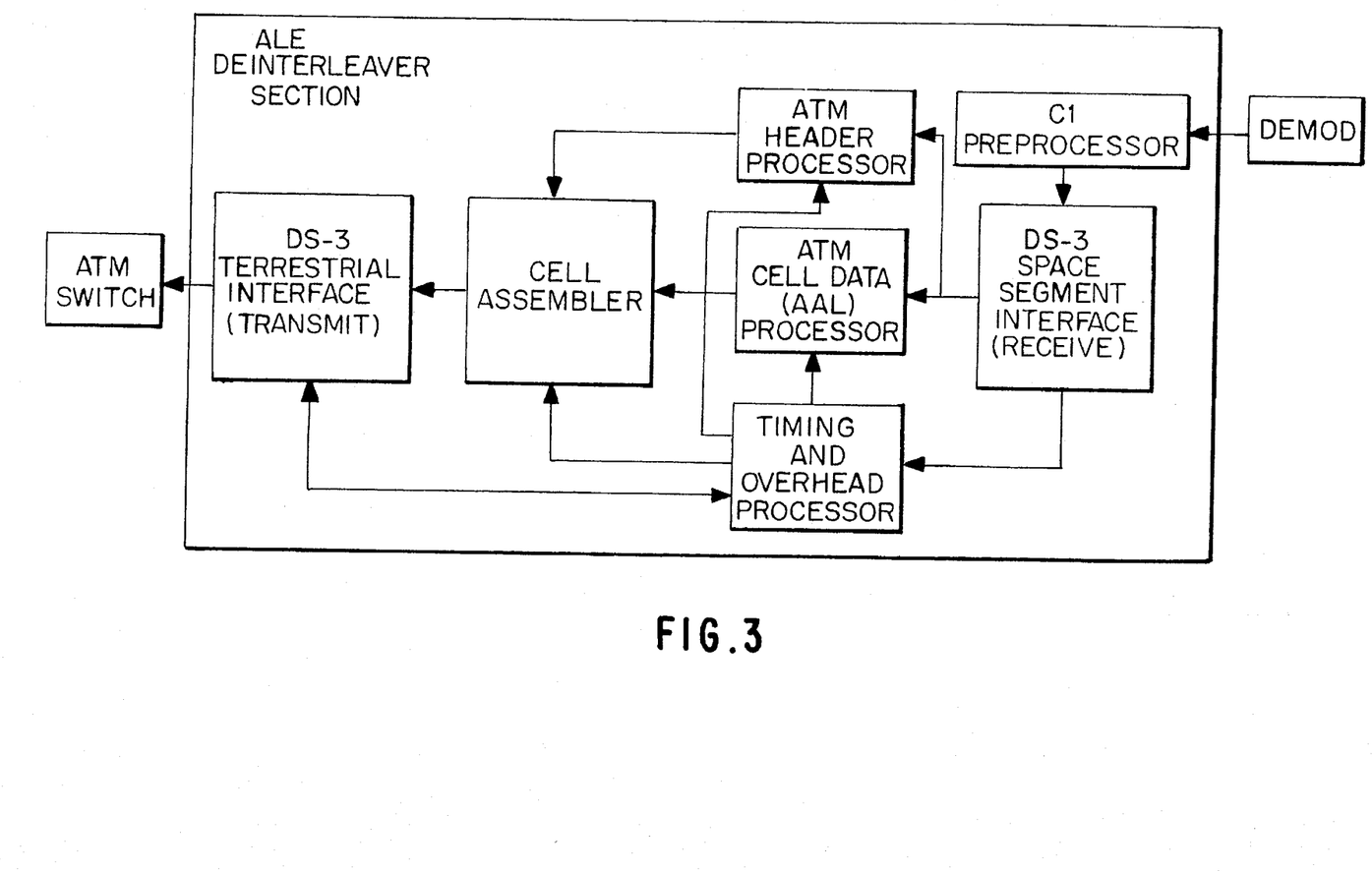
FIG. 3 illustrates a more detailed block diagram of the deinterlevaer of FIG. 1.

The payload is kept intact for this particular operation, with the payload of the original first ATM cell being appended to the new first interleaved cell header, and so forth. The newly formatted cells are then transmitted over a communications link encountering burst errors. The deinterleaver operation at the receiver end brings the cells to the original ATM cell format with at most one bit error in the ATM header, which is corrected. FIGS. 2 and 3 show the block diagrams of these functions.

The technique of the present invention can be applied equally well to ATM cells for transmission at different rates. The present invention can be applied for ATM transmission at 155.52 Mbps or higher, where there will be more than forty ATM cells in one 125 microsecond SDH frame. Notice also that at lower rates than DS-3 rate or E3 rate, the same concept can be applied.

The technique used in this invention relates to all of the ATM layer, the AAL layer and the physical layer. These are described below with respect to a specific example of ATM transmission over a DS-3 communications link.

In this example, interleaving is performed independently for the header and the cell payload. Bit interleaving is performed over a certain set of 40 cells as described above, to protect the header. If the cell data is AAL type 1, the first byte following the header is also bit interleaved from a subset of 8 cells, and the remaining payload data bytes are not interleaved. If the cell data is AAL type 3/4, the entire cell payload is byte interleaved from a subset of a certain number of cells.

Interleaver Conventions

The following interleaving conventions are observed in the ALE:

1) The 5 octets in the ATM cell header are interleaved independently of the 48 octet ATM payload.
2) Header interleaving may be enabled or disabled.
3) When enabled, the header bit interleaving skips [N−1] adjacent cells, where $1 \leq N \leq 12$. This is done to compensate for the correction/detection modes specified in the ATM specifications I.432.
4) The interleaver/de-interleaver frame size, F, (in units of cells) is given by F=N*40.
5) Cell payload interleaving may be enabled or disabled.
6) Type 3/4 (byte) interleaving is performed over a subframe of K cells, where $1 \leq K \leq 48$.
7) When type 3/4 interleaving is active, F/48 must be an integer value.

The following conventions are used in the following discussion to represent the bits in the ATM cell:

1) $H_{i \cdot j}$ represents a bit in a cell header with the subscript indicating the cell and bit. Thus, $H_{1 \cdot 1}$ represents the first bit of the first cell, $H_{5 \cdot 2}$ represents the second bit of the fifth cell, and so on.
2) $D_{i \cdot j}$ represents a byte in the payload data with the subscript indicating the cell and byte. $D_{1 \cdot 1}$ represents the first byte of the first cell, $D_{1 \cdot 2}$ the second byte of cell 1, $D_{1 \cdot 48}$ the last byte of cell 1, etc.
3) $S_{i \cdot j}$ represents the bit sequence for the first byte of cell data for AAL type 1 interleaving. $S_{4 \cdot 1}$ represents the first bit of the first byte of cell 4, $S_{4 \cdot 2}$ the second bit of the first byte of cell 4, etc.

With these conventions in mind, the incoming or outgoing data stream at the terrestrial interface is represented as follows:

$$H_{1 \cdot 1} H_{1 \cdot 2} H_{1 \cdot 3} \ldots H_{1 \cdot 40} D_{1 \cdot 1} D_{1 \cdot 2} \ldots D_{1 \cdot 48}, H_{2 \cdot 1} H_{2 \cdot 2} H_{2 \cdot 3} \ldots H_{2 \cdot 40} D_{2 \cdot 1} D_{2 \cdot 2} \ldots D_{2 \cdot 48} \ldots$$

Figure 4:
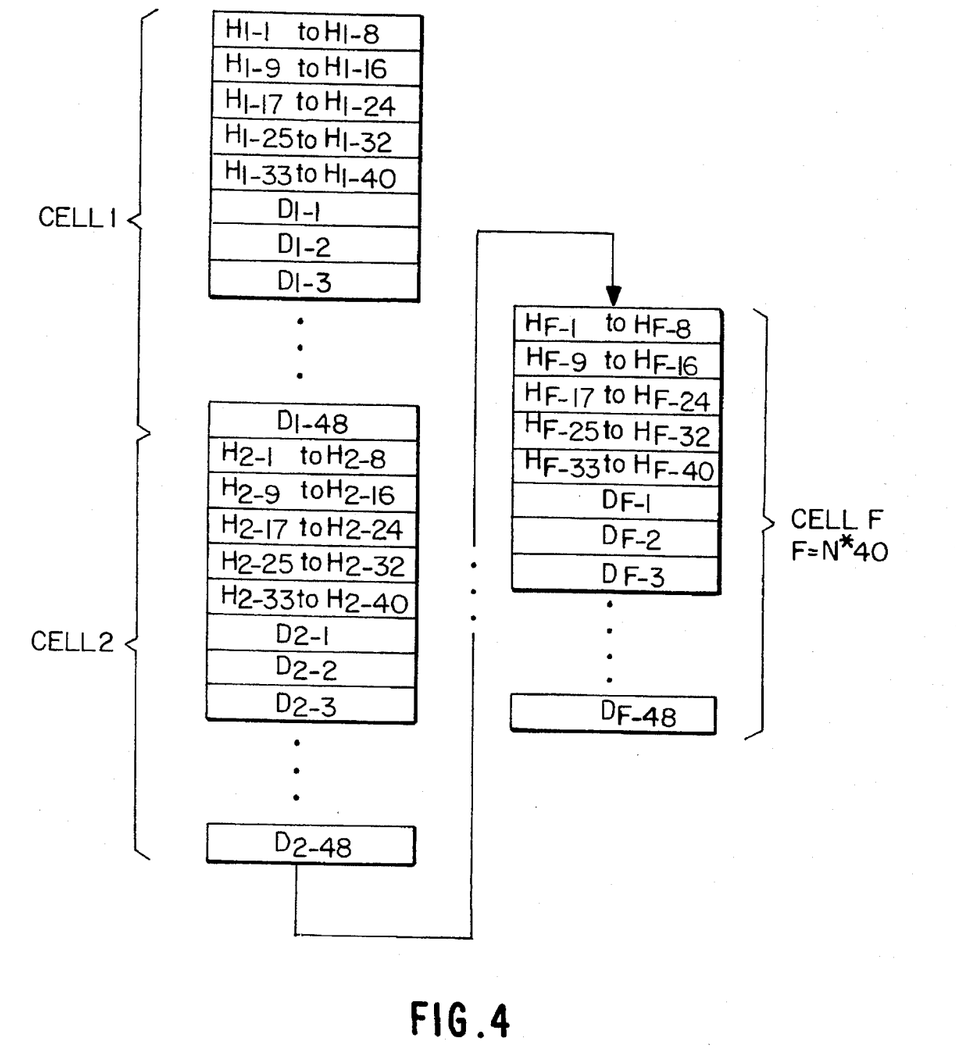
FIG. 4 is an illustration of the format of original ATM cell data stored in the interleaver memory.

The header and cell data from F=N*40 cells are stored in a cell memory over each interleaver frame. Data is stored in byte format as illustrated in FIG. 4. The 40 bits in each header occupy 5 bytes of memory.

Header Interleaving

After an interleaver frame of data is stored, the header bytes are read out and interleaved for each successive transmitted cell. An example interleaved cell stream for a value of N=2 and for AAL 1 and 3/4 interleaving disabled will be as follows:

$H_{1-1}H_{3-1}H_{5-1}\ldots H_{79-1}D_{1-1}D_{1-2}\ldots D_{1-48}H_{2-1}H_{4-1}H_{6-1}\ldots H_{80-1}D_{2-1}D_{2-2}\ldots D_{2-48}$ $H_{1-2}H_{3-2}H_{5-2}\ldots H_{79-2}D_{3-1}D_{3-2}\ldots D_{3-48}H_{2-2}H_{4-2}H_{6-2}\ldots H_{80-2}D_{4-1}D_{4-2}\ldots D_{4-48}$ $H_{1-3}H_{3-3}H_{5-3}\ldots H_{79-3}D_{5-1}D_{5-2}\ldots D_{5-48}H_{2-4}H_{4-4}H_{6-4}\ldots H_{80-4}D_{6-1}D_{6-2}\ldots D_{6-48}$ $H_{1-40}H_{3-40}H_{5-40}\ldots H_{79-40}D_{79-1}D_{79-2}\ldots D_{79-48}H_{2-40}H_{4-40}H_{6-40}\ldots H_{80-40}D_{80-1}D_{80-2}\ldots D_{80-48}$

AAL Type 1 Interleaving

AAL type 1, specified in CCITT Recommendation I.363, provides transfer of user data with a constant source bit rate and delivery with the same bit rate. The service also provides the transfer of timing and structure information between source and destination. AAL type 1, therefore, can be used to transfer constant bit rate voice and video via ATM. Satellite error characteristics impact the operation of this protocol, and while AAL type 1 performance requirements have not been specified, excessive numbers of lost cells and errored cells will impact the performance of the protocol. For this reason, another interleaving technique is used on the cell data to reduce this effect.

AAL type 1 interleaving in accordance with this invention is a bit interleaving function similar to header interleaving. However, type 1 payload interleaving is performed independent of header interleaving. After an interleaver frame of data is stored, the first bytes of cell payload (the sequence number) from a block of 8 cells are read out and interleaved for each successive transmitted cell. For each byte accessed, only one bit is used. Thus, for each transmitted cell, 8 byte locations are read. Each location is from a different stored cell. Cell data bytes 2 through 48 are not interleaved.

The bit sequence for the first byte of cell data for AAL type 1 interleaving is represented by $S_{i-j}$. An example interleaved cell stream (with header interleaving) for a value of N=2 will be as follows:

$H_{1-1}H_{3-1}H_{5-1}\ldots H_{79-1}S_{1-1}S_{2-1}S_{3-1}S_{4-1}S_{5-1}S_{6-1}S_{7-1}S_{8-1}D_{1-2}\ldots D_{1-48}$ $H_{2-1}H_{4-1}H_{6-1}\ldots H_{80-1}S_{1-2}S_{2-2}S_{3-2}S_{4-2}S_{5-2}S_{6-2}S_{7-2}S_{8-2}D_{2-2}\ldots D_{2-48}\ldots$ $H_{1-4}H_{3-4}H_{5-4}\ldots H_{79-4}S_{1-7}S_{2-7}S_{3-7}S_{4-7}S_{5-7}S_{6-7}S_{7-7}S_{8-7}D_{7-2}\ldots D_{7-48}$ $H_{2-4}H_{4-4}H_{6-4}\ldots H_{80-4}S_{1-8}S_{2-8}S_{3-8}S_{4-8}S_{5-8}S_{6-8}S_{7-8}S_{8-8}D_{8-2}\ldots D_{2-48}$ $H_{1-5}H_{3-5}H_{5-5}\ldots H_{79-5}S_{9-1}S_{10-1}S_{11-1}S_{12-1}S_{13-1}S_{14-1}S_{15-1}S_{16-1}D_{9-2}\ldots D_{9-48}$ $H_{2-5}H_{4-5}H_{6-5}\ldots H_{80-5}S_{9-2}S_{10-2}S_{11-2}S_{12-2}S_{13-1}S_{14-1}S_{15-1}S_{16-1}D_{10-2}\ldots D_{10-48}$ $H_{1-40}H_{3-40}H_{5-40}\ldots H_{79-40}S_{73-7}S_{74-7}S_{75-7}S_{76-7}S_{77-7}S_{78-7}S_{79-7}S_{80-7}D_{79-2}\ldots D_{79-48}$ $H_{2-40}H_{4-40}H_{6-40}\ldots H_{80-40}S_{73-8}S_{74-8}S_{75-8}S_{76-8}S_{77-8}S_{78-8}S_{79-8}S_{80-8}D_{80-2}\ldots D_{80-48}$

AAL Type 3/4 Interleaving

AAL type 3/4 provides transfer of user data with a variable source bit rate. AAL type 3/4, therefore, can be used to transfer variable bit rate data over ATM. Satellite error characteristics also impact the operation of this protocol. Due to the relatively short CRC (10 bits) used in this layer, burst errors introduced by FEC and scrambling on the satellite channel can raise the probability of an undetected error, thereby resulting in the delivery of corrupted data to the user. The ALE uses another cell data interleaving technique to reduce the probability of occurrence of undetected AAL 3/4 errors.

AAL type 3/4 interleaving is a byte interleaving function performed on the information fields independent of header interleaving. After an interleaver frame of data is stored, the 48 information field data bytes from a block of K cells are read out and interleaved for each successive transmitted cell. For each transmitted cell, 48 byte locations are read. L-bytes are read from each of the K cells in the block. The constraint on K and L is that L*K=48. If AAL type 3/4 interleaving is active, an additional constraint is that 48 evenly divides F. This is to ensure that interleaving is completely contained within an interleaver frame interval. Thus, the interleaver frame is subdivided into M=F/K subblocks. Designating the cell sequence as $\{C_1, \ldots, C_K\}$ and the byte sequence as $\{B_1, \ldots, B_L\}$, the addressing sequence is as follows:

$\{C_1, \ldots, C_K\}B_1, \{C_1, \ldots, C_K\}B_2, \ldots, \{C_1, \ldots, C_K\}B_L$ Assuming values of N=6, K=8, and L=6, the interleaved cell stream (with header interleaving) for the second transmitted cell in an interleaver frame interval will be as follows:

$H_{2-1}H_{8-1}H_{14-1}\ldots H_{236-1}D_{1-7}D_{2-7}D_{3-7}D_{4-7}D_{5-7}D_{6-7}D_{7-7}D_{8-7}D_{1-8}D_{2-8}D_{3-8}D_{4-8}D_{5-8}D_{6-8}D_{7-8}D_{8-8}$ $D_{1-9}D_{2-9}D_{3-9}D_{4-9}D_{5-9}D_{6-9}D_{7-9}D_{8-9}D_{1-10}D_{2-10}D_{3-10}D_{4-10}$ $D_{5-10}D_{6-10}D_{7-10}D_{8-10}D_{1-11}D_{2-11}$ $D_{3-11}D_{4-11}D_{5-11}D_{6-11}D_{7-11}D_{8-11}D_{1-12}D_{2-12}D_{3-12}D_{4-12}D_{5-12}D_{6-12}D_{7-12}D_{8-12}$

Header Error Detection/Correction

The 8 check bits in the HEC field are generated at the transmitting end via a cyclic encoding procedure using the contents of the first four bytes of the ATM cell header. In particular, the check bits are first obtained as an 8-bit sequence which is the remainder of the division (modulo 2) by the generator polynomial $x^8+x^2+x+1$ of the product $x^8$ multiplied by the contents of the ATM cell header excluding the HEC field.

The check bits are next added (modulo 2) to an 8-bit pattern (01010101) and the result inserted in the HEC field of the ATM cell header. The receiver must subtract (equal to adding modulo 2) the same pattern from the check bits before calculating the syndrome of the header. This procedure of adding and subtracting an 8-bit pattern to check bits is included to improve the cell delineation performance and in no way affects the error detection/correction capabilities of the generated HEC field. The check bits in the HEC field provide both a one-or-more bit error-detection capability and a one-bit error-correction capability for the ATM cell header.

Figure 5:
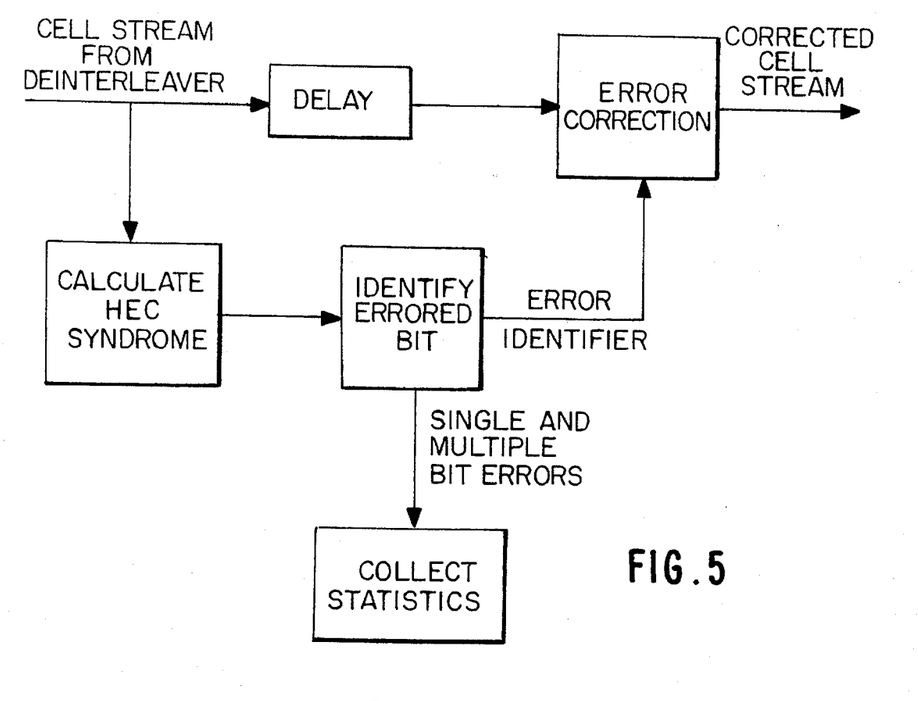
FIG. 5 is a functional block diagram of a header error correction contained within the cell assembly of the de-interleaver of FIG. 3.

The present technique does not require that the ALE generate the HEC field in cell headers. This is done by the cell source which is most likely an ATM switch. However, after deinterleaving, one or more cells may contain errors as a result of an error burst corrupting an interleaved cell. The deinterleaver contains an error detection/correction function as illustrated in FIG. 5. This function follows the cell assembler function in FIG. 4, calculating the header syndrome and identifying which bit is in error if a single bit error occurs. The data stream is delayed and presented to an error correction function which utilizes the errored bit identifier to invert that bit in the header. The error identifier also detects the occurrence of multiple bit errors but cannot identify which bits are in error. If multiple bit errors occur, the header is left uncorrected.

The header error detection/correction function also collects statistics concerning the number of single error (SER) events and multiple error (MER) events which occur.

Physical Layer

An ATM Physical Layer Convergence Protocol (PLCP) is defined for mapping of ATM cells into existing DS3 facilities. The PLCP frame is a 125 μsec interval comprising a sequence of 12 ATM cells. The C1 byte in the path overhead (POH) is used to indicate the number of trailer nibbles (13 or 14) at the end of the PLCP frame. Corruption of the C1 octet (eg. as a result of burst errors) may result in an incorrect determination of the number of nibbles in the trailer. This, in turn, results in nibble misalignment of the beginning of the next frame interval and the ultimate loss in frame synchronization of the PLCP device. With interleaving of cell headers in the ALE, the concomitant loss of data in multiple cells, from the time the frame misalignment occurs to the time the PLCP device re-enters the frame acquisition mode and detects the A1/A2 octet pair, can result in the multiplication of errors in the de-interleaved cell headers. This can potentially result in the loss of many more cells than would have been lost had interleaving not been used.

Figure 6:
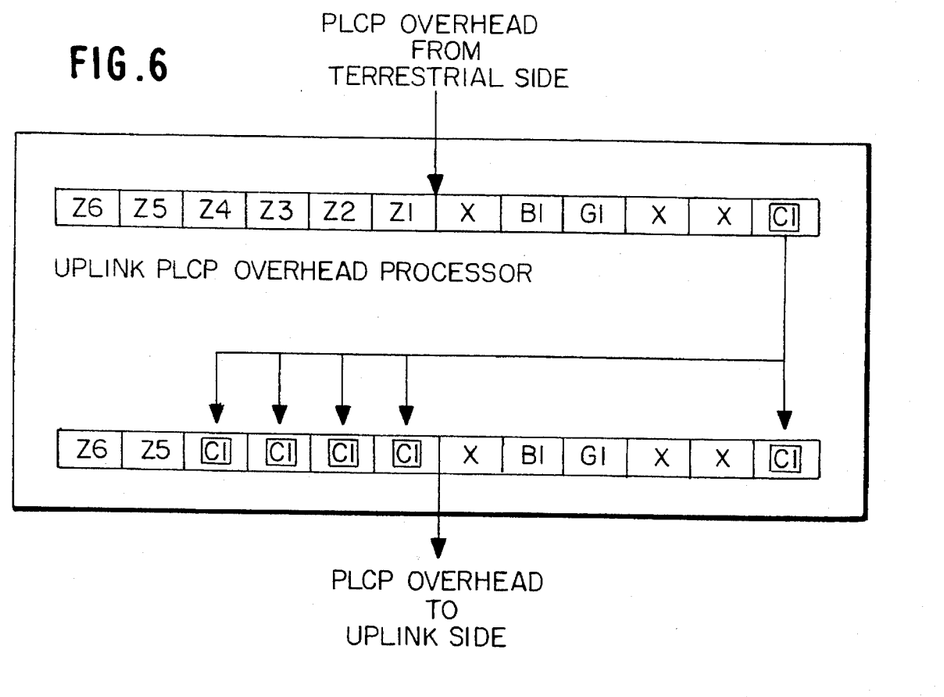
FIG. 6 is a diagram for explaining C1 octet replication in the transmit frame for protecting the PLCP frame synchronization.

This problem has been eliminated through a technique which uses the growth octets (Z1–Z6). On the uplink side of the ALE, the C1 octet received from the terrestrial side is delayed one PLCP frame. The C1 octet is then inserted in the Z1 through Z4 bytes as well as the C1 byte of the following PLCP frame as illustrated in FIG. 6.

Figure 7:
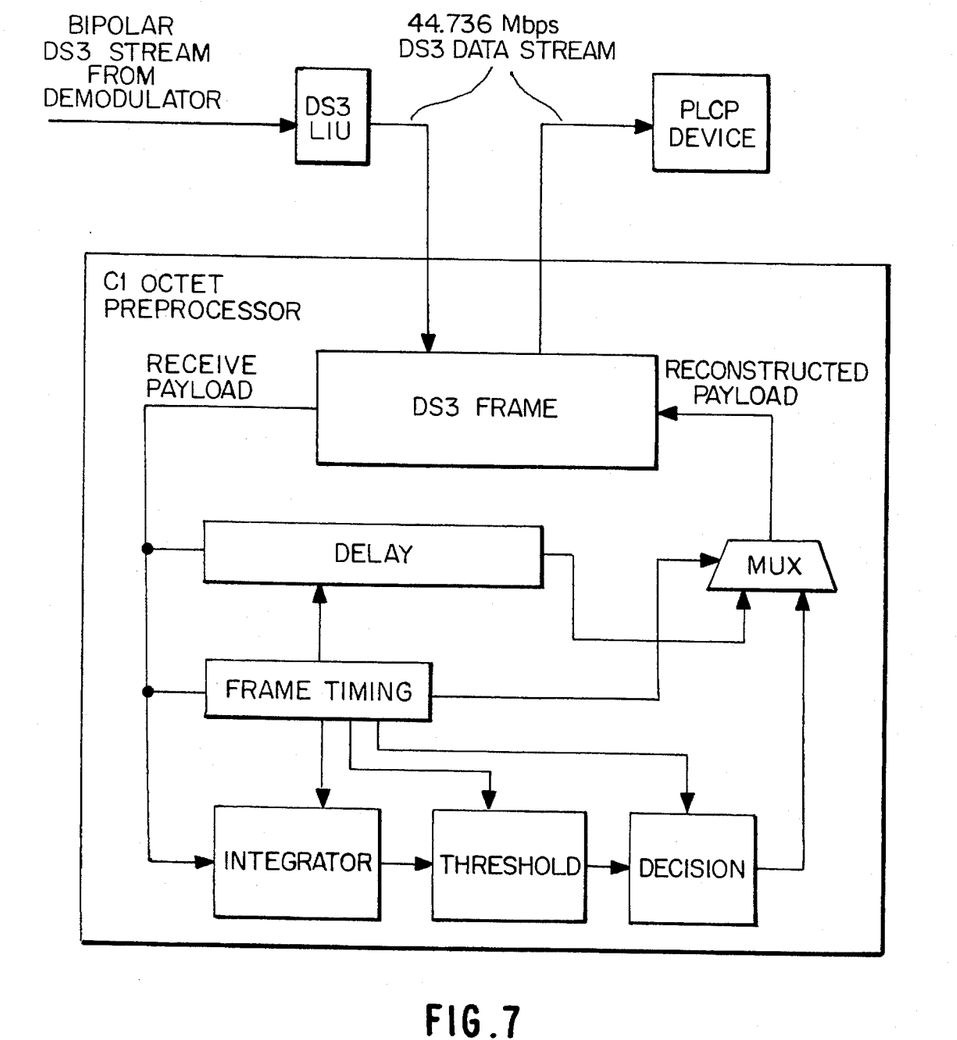
FIG. 7 is a block diagram of a C1 octet preprocessor used in connection with the octet replication of FIG. 6.

A pre-processor is inserted in the downlink DS-3 data stream between the DS-3 line interface unit and the downlink PLCP device as illustrated in FIG. 7. A DS-3 framer device extracts the payload data stream from the DS-3 stream. The pre-processor synchronizes to the A1/A2 octet pair in the payload data, extracts the applicable Z octets and the C1 octet, and performs a bitwise integration and thresholding to reconstruct the transmitted C1 octet. The reconstructed C1 octet is then inserted into the C1 octet position in the payload data stream. The corrected payload data stream is reframed to the DS-3 stream which is then provided to the input of the PLCP device.

Deinterleaver Frame Acquisition and Synchronization

Figure 8:
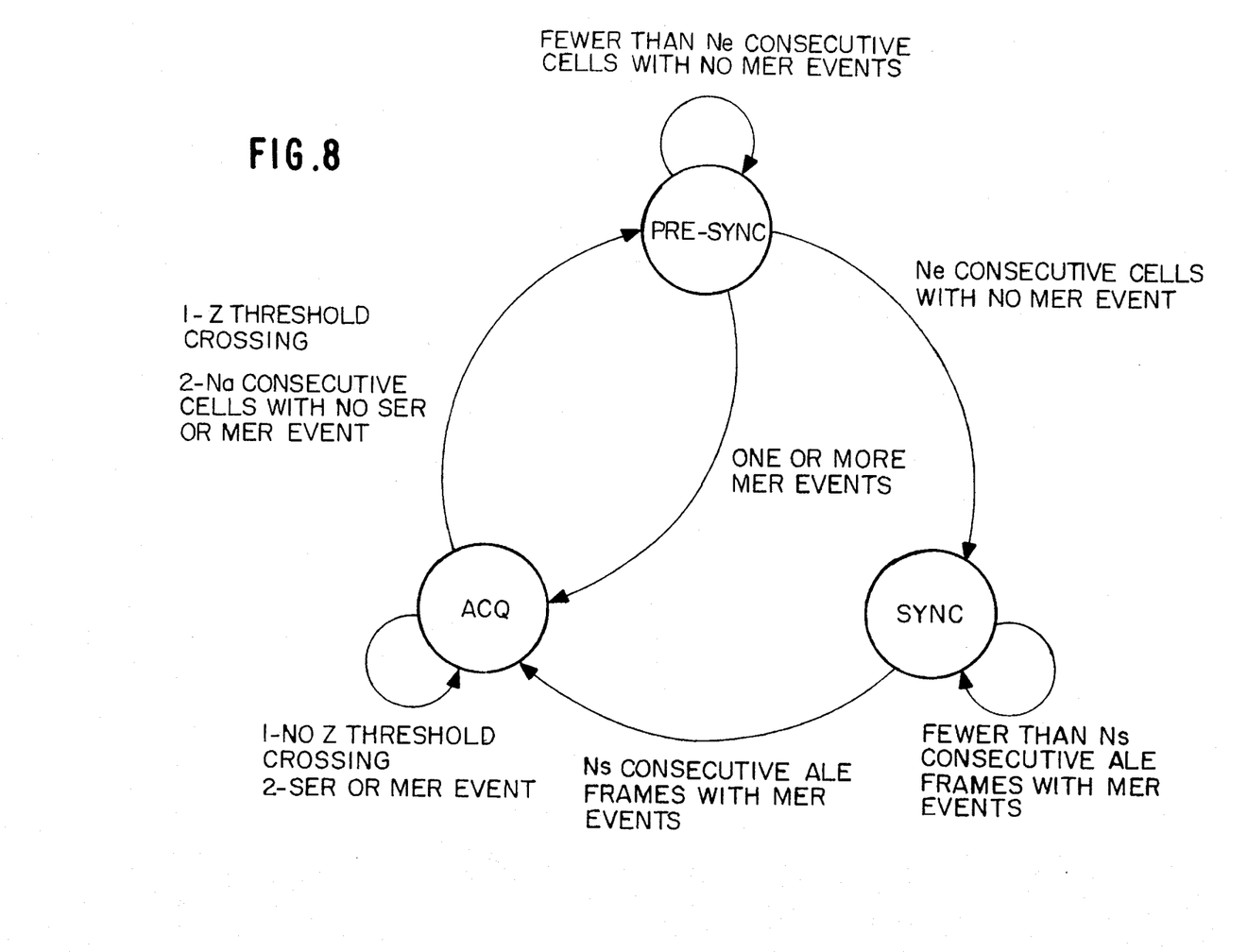
FIG. 8 illustrates a state diagram for a deinterleaver acquisition and synchronization procedure.

The interleaver frame interval, F, is established arbitrarily by the interleaver when it is enabled. The interleaver repetitively performs all of its interleaving within a bock of F cells. In order to correctly deinterleave the interleaved data stream, the deinterleaver must locate the first cell in the interleaver frame interval and synchronize to it. FIG. 8 illustrates a state diagram for the deinterleaver acquisition and synchronization procedure. When the deinterleaver is enabled, it enters the Acquisition (Acq) state. Two separate acquisition procedures are described below: Z-byte acquisition and step search acquisition. The deinterleaver can simultaneously execute both procedures.

Following acquisition, the deinterleaver enters the Pre-Sync state. This state is a verification state to ensure that the timing established by acquisition is indeed correct. If the timing is not correct, then single error (SER) and multiple error (MER) events will be reported by the header error detection procedure. If any MER event occurs while in the Pre-Sync state, the procedure returns to the Acq state. If a programmable number, $N_e$, of consecutive cells occur with no MER event, then the procedure transitions to the Sync state. It can safely be assumed that if only SER events occur, the correct timing relationship has been established. The procedure remains in the Sync state until a programmable number, $N_s$, of consecutive MER events occur. If $N_s$ consecutive MER events occur, the procedure returns to the Acq state.

The step search acquisition procedure is based on the assumption that if the HEC syndrome is zero (no errors) in the deinterleaved cell stream, then the ALE frame timing must be correct. In this procedure, the deinterleaver frame boundary is arbitrarily established when the deinterleaver is enabled. The header error detection declarations are monitored. If $N_a$ consecutive cells are received with no SER or MER event, the frame timing is assumed to be correct and the acquisition procedure terminates. If $N_a$ consecutive cells are not received with no SER or MER event within the first F-1 cells of the frame, the next frame interval is forced to begin one cell duration early. Thus the frame duration is always F-1 cells long until acquisition occurs. Eventually, the deinterleaver frame will begin on the first cell of the ALE frame. The average acquisition time for this procedure is $T_a$=F/2 acquisition frame intervals $T_a$=[(800*$N^2$−20*N)/12]* 125 μs For N=12, $T_a$=1.975 s.

Z-Byte Acquisition

Figure 9:
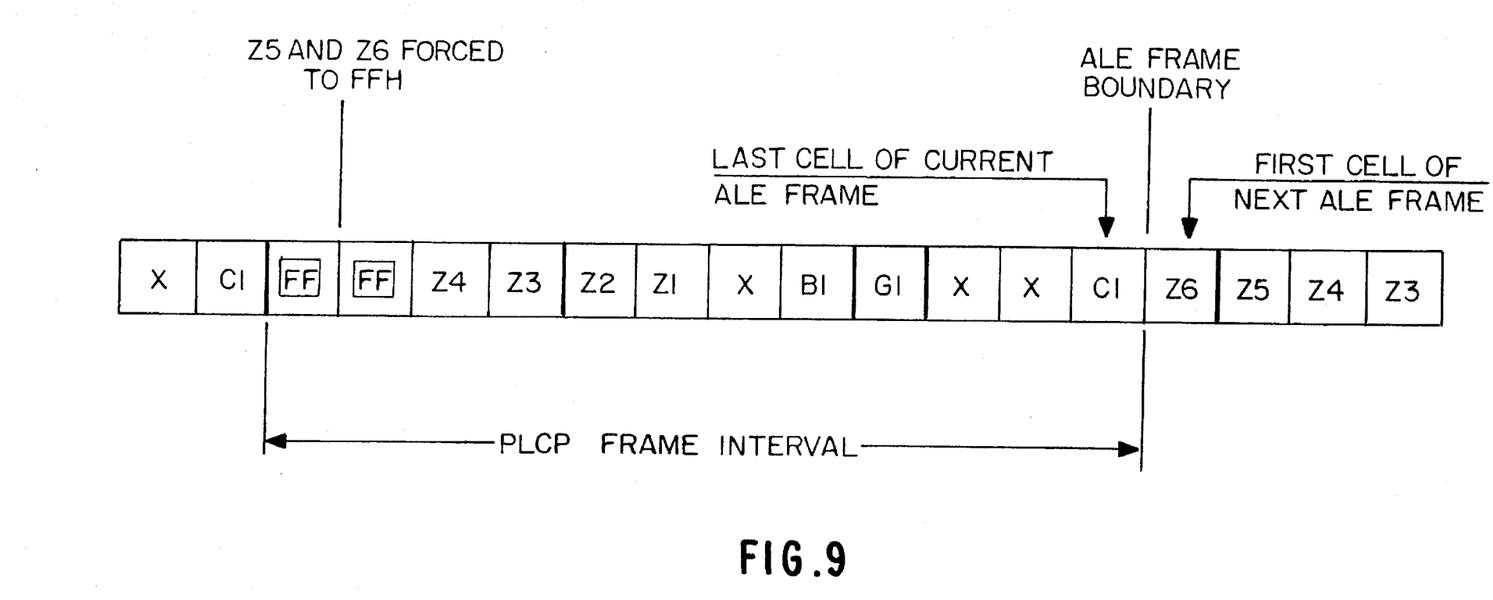
FIG. 9 illustrates the ALE frame alignment for Z-byte acquisition.

The average acquisition time for the step search procedure is rather significant. To alleviate this problem, the Z-Byte acquisition may be enabled. When enabled, the interleaver synchronizes the start of the ALE frame interval to the transmit PLCP frame interval. The duration of the ALE frame interval, F, must be a multiple of 12 when Z-Byte acquisition is enabled. The interleaver inserts the pattern FFH in $Z_5$ and $Z_6$ in the PLCP frame immediately preceding the start of the next ALE frame interval as illustrated in FIG. 9. $Z_5$ and $Z_6$ normally contain the value 00H.

The deinterleaver automatically synchronizes to the PLCP frame and continuously integrates the $Z_5$ and $Z_6$ bits in the PLCP overhead stream within the PLCP frame interval. The integrated value, $S_Z$, is compared to a threshold, $T_Z$. When $S_Z \geq T_Z$, the deinterleaver frame interval is synchronized to the first cell of the following PLCP frame interval. Using this technique, the average acquisition time is reduced to $T_a$=F/2

For N=12, $T_a$=2.5 ms

The above discussion has been limited to the ATM transmission via DS-3. The problems and solutions for ATM transmission via SDH (51.84 Mbps, 155.52 Mbps, or higher) are identical at ATM and AAL layers, and the present invention is applicable in that case as well in the same manner as described above. At the physical layer, the technique described above requires certain modifications.

More particularly, in the SDH operation the burst errors cause problems due to corruption of the pointer bytes, called AU-4, consisting of the New Data Flag (NDF), and the H1 and H2 bytes. If any three bits in the New Data Flag (NDF)

normal pattern (0110) are inverted by the burst error occurrence and any bit in the ten bit pointer value gets corrupted, then the wrong pointer value will be identified for at least three frames (until a consistent correct pointer value is received three times consecutively.)

Interleaving the NDF over two frames, such that no more than two bits of the NDF flag are in one frame, will reduce the probability of three bits of NDF being in error, considerably reducing the loss of data.

If the majority of I bits or D bits in the H1 or H2 pointer become corrupted by a burst or error, the positive and negative justification operations will be affected, resulting in a loss of data. Again, interleaving the bits of H1 and H2 bytes over four frames (or two frames using I and D bits separately) will ensure correct majority decision in a burst error environment.

While several particular forms of the invention have been illustrated and described, it will be apparent that various modifications can be made without departing from the spirit and scope of the invention.

What is claimed is:

1. A method for communicating over a communications link from a transmit end to a receive end in an asynchronous transfer mode (ATM), said method comprising the steps of:

receiving at said transmit end a sequence of original ATM cells each having a plurality of header bytes and a plurality of payload bytes;

forming header interleaved bytes each having bits from a plurality of headers from different original ATM cells;

transmitting interleaved cells comprising said header interleaved bytes and said payload bytes, wherein said payload bytes are non-interleaved, to a receive end; and deinterleaving said interleaved cells to obtain said original ATM cells.

2. The method according to claim 1, further comprising the step of:

appending said payload bytes to said header interleaved cells, where said payload bytes are unaffected during said forming header interleaved cells step.

3. The method according to claim 1, further comprising the step of detecting and correcting errors in said original ATM cells after said deinterleaving step.

4. The method according to claim 3, where in said step of detecting and correcting errors comprises the steps of:

calculating a header syndrome;

identifying an error bit when a single error event occurs;

presenting said ATM cells to an error correction function; and inverting said error bit in said error correction function in accordance with said identifying step.

5. The method according to claim 4, wherein said step of detecting and correcting errors further comprises:

counting each said single error event; and counting each said multiple error event.

6. The method according to claim 1, wherein said step of deinterleaving comprises:

locating a first ATM cell in an interleaver frame interval;

verifying that said locating step has been performed correctly; and synchronizing to said first ATM cell.

7. The method according to claim 6, wherein said locating step comprises:

arbitrarily establishing said first ATM cell in said interleaver frame interval.

8. The method according to claim 6, wherein said locating step comprises:

synchronizing the start of a first type frame interval to a second type frame interval, said second type frame interval being a transmit frame interval;

inserting a specified byte pattern into at least one byte position in said second type frame interval immediately preceding a next first type frame interval;

synchronizing a deinterleaver to said second type frame interval;

integrating bits of said specified byte pattern in said at least one byte position to form an integrated value, $S_Z$;

comparing $S_Z$ to a threshold, $T_Z$; and synchronizing a deinterleaver frame interval to a first cell of an immediately following second type frame interval when $S_Z \geq T_Z$.

9. The method according to claim 8, wherein:

said first type frame interval is an ATM Link Enhancer (ALE) frame interval; and said second type frame interval is a Physical Layer Convergence Protocol (PLCP) frame interval.

10. The method according to claim 6, wherein said verifying step further comprises:

reporting single error and multiple error events when said locating step has been performing incorrectly; and returning to said locating step when a multiple error event occurs.

11. A method of bit interleaving signals to avoid undetected errors in an Asynchronous Transmission Mode (ATM) communications system transmitting frames, each of said frames having F cells, each of said cells having a header of D bytes and a payload of P bytes, F, D and P being integers, said method comprising the steps of:

selecting at least one bit from a first payload byte of each of L different cells of one of said frames, L being an integer;

combining said selected bits to form L interleaved payload bytes; and transmitting said F cells, wherein said payload comprises one of said interleaved payload bytes and P–1 remaining payload bytes, wherein said P–1 remaining payload bytes are non-interleaved.

12. The method according to claim 11, wherein:

P=48; and

L=8.

13. The method according to claim 11, wherein:

said signal is in ATM Adaptation Layer (AAL) Type 1 format.

14. A method of byte interleaving signals to avoid undetected errors in an Asynchronous Transmission Mode (ATM) communications system transmitting frames, each of said frames having F cells, each of said cells having a header of D bytes and a payload of P bytes, F, D and P being integers, said method comprising the steps of:

selecting a subframe containing K cells, $\{C_1, \ldots, C_K\}$;

reading L payload bytes, $\{B_1, \ldots, B_L\}$, from each of said K cells, where L*K=P and where L<P;

combining said L payload bytes from each cell to form an interleaved payload; and transmitting said interleaved payload as part of a transmit frame.

15. The method according to claim 14, wherein:

the sequence of bytes in said interleaved payload is $\{C_1, \ldots, C_K\}B_1, \{C_1, \ldots, C_K\}B_2, \ldots, \{C_1, \ldots, C_K\}B_L$.

16. The method according to claim 14, wherein:

F=N*40, wherein $1 \leq N \leq 12$ and N is selected so that F/P is an integer.

17. The method according to claim 16, wherein:

P=48.

18. The method according to claim 14, wherein:

said signal is in ATM Adaptation Layer (AAL) Type 3/4 format.

19. A method of reducing data loss during communication over a communications link from a transmit end to a receive end in an Asynchronous Transfer Mode (ATM), transmitting frames, said method comprising:

interleaving a first pointer byte, New Data Flag (NDF) over two of said frames, wherein no more than two NDF bits reside in a single frame; and interleaving bits of a second pointer byte, H1, and a third pointer byte, H2, over four of said frames.

20. A method according to claim 19, wherein:

said system uses Synchronous Digital Hierarchy (SDH) signal format.

21. A method of protecting data against loss of framing during transmission and reception of said data, said data comprising frames, each of said frames having plural byte positions, for each of said frames said method comprising the steps of:

selecting an original frame marker byte, C1, from a first byte position in said frame;

inserting said original frame marker byte into said first byte position and into at least one additional byte position in said frame, thereby creating a reformatted frame containing multiple frame marker bytes;

transmitting said reformatted frame;

receiving said reformatted frame;

synchronizing to synchronization bytes, A1 and A2 in said reformatted frame;

extracting said multiple frame marker bytes from said first byte position and from said at least one additional byte position; and comparing said multiple frame marker bytes to reconstruct said original frame marker byte.

* * * * *